Aug. 25, 1942.  E. GRACE  2,294,230
GEARSHIFT MECHANISM
Filed April 29, 1939  2 Sheets-Sheet 1
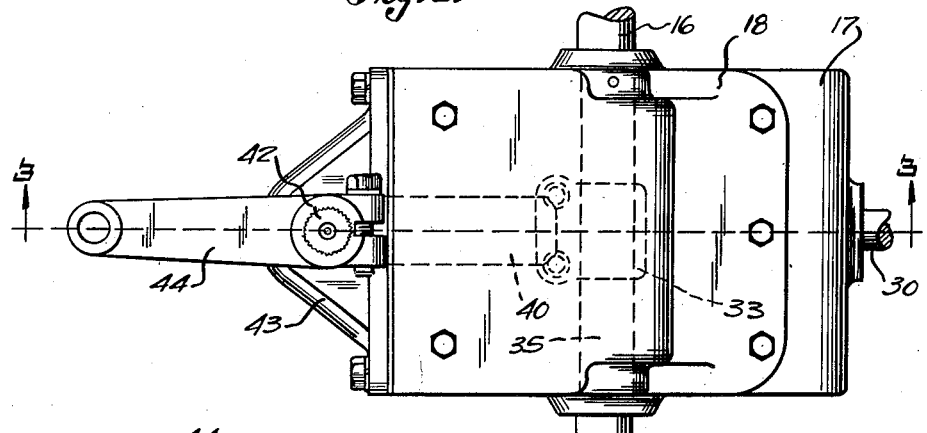
Fig. 1.
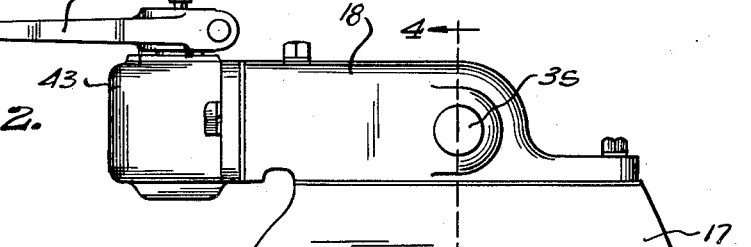
Fig. 2.
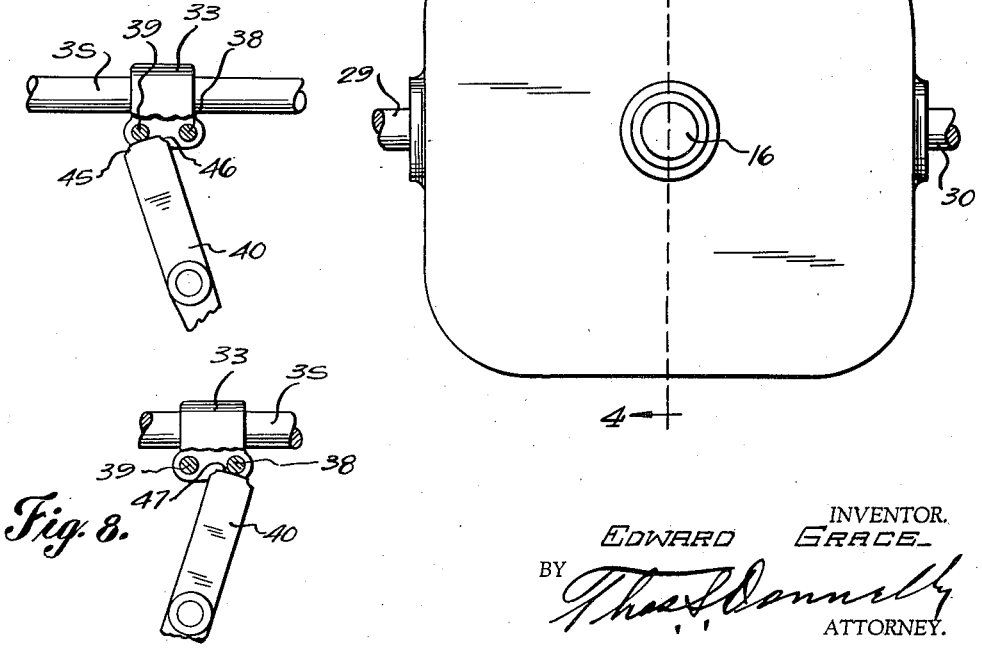
Fig. 7.
Fig. 8.
INVENTOR.
EDWARD GRACE
BY
ATTORNEY.

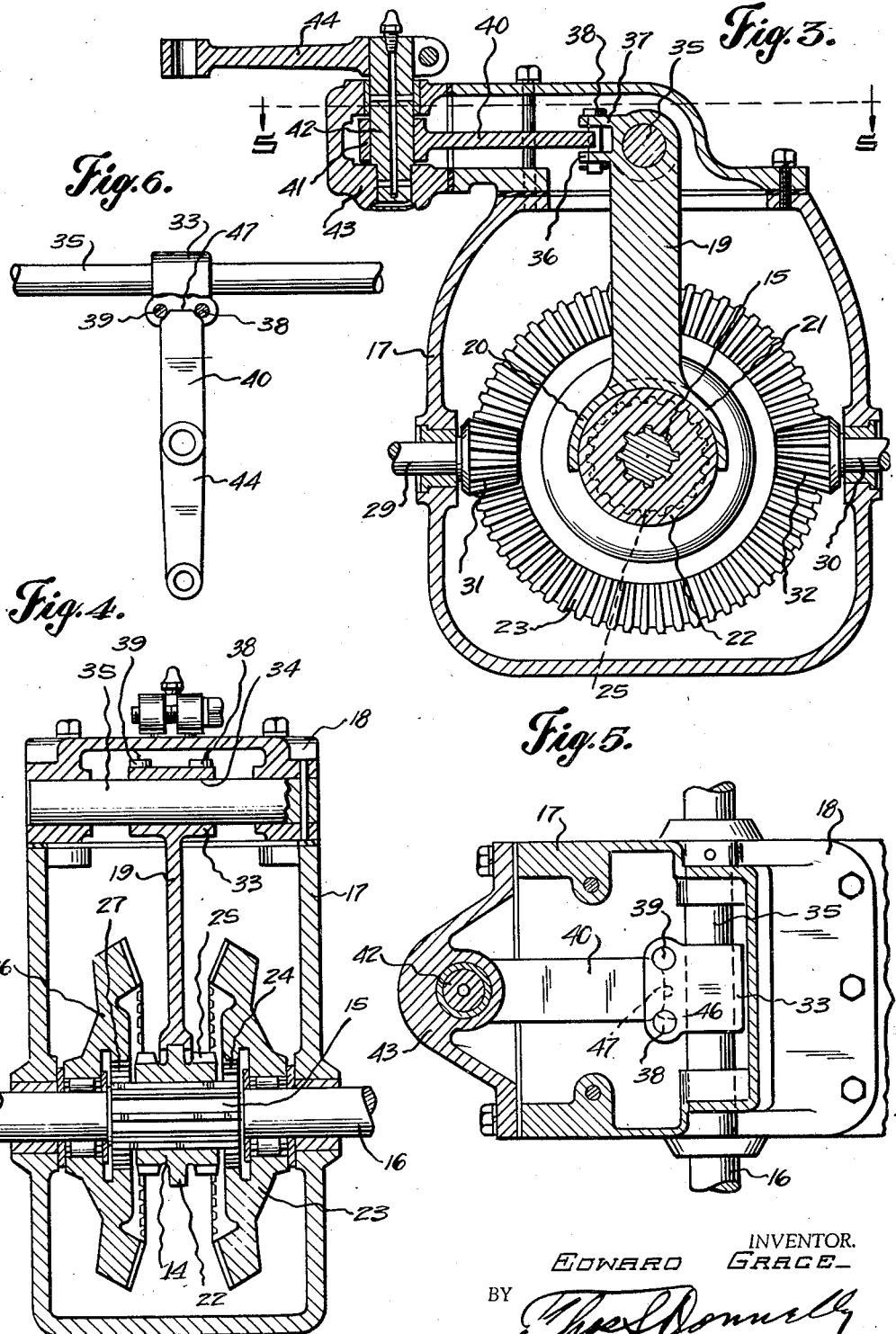

Patented Aug. 25, 1942

2,294,230

UNITED STATES PATENT OFFICE 2,294,230

GEARSHIFT MECHANISM

Edward Grace, Detroit, Mich.

Application April 29, 1939, Serial No. 270,779

3 Claims. (Cl. 74—473)

My invention relates to a new and useful improvement in a gear shifting mechanism adapted for use primarily in shifting gears in transmissions.

It is an object of the present invention to provide a gear shifting mechanism of this class which will be simple in structure, economical in manufacture, compact, durable, easily and quickly operated, and highly efficient in use.

Another object of the invention is the provision of a gear shifting mechanism so arranged and constructed that it will lend itself for application to structures of various types having shiftable gears.

Another object of the invention is the provision of a gear shifting mechanism which may be easily and quickly adjusted to vary the "throw."

Another object of the invention is the provision of a gear shifting mechanism so arranged and constructed that, immediately upon the shifting of the gear, the mechanism will serve to lock the gear in its shifted position.

Other objects will appear hereinafter.

The operation and construction of the invention will, it is believed, appear evident from the specification which embodies drawings and in which:

Fig. 1 is a top plan view of a structure embodying the invention.

Fig. 2 is a side elevational view of the structure embodying the invention.

Fig. 3 is a sectional view taken on line 3—3 of Fig. 1.

Fig. 4 is a sectional view taken on line 4—4 of Fig. 2.

Fig. 5 is a sectional view taken on line 5—5 of Fig. 3.

Fig. 6 is a top plan view of the gear shifting assembly in a semi-diagrammatic form.

Fig. 7 is a top plan view in semi-diagrammatic form illustrating the gear shift lever thrown to one side.

Fig. 8 is a view similar to Fig. 7 throwing the gear shift thrown lever to the other side.

In the drawings, I have illustrated the invention used for shifting a gear 14, which is mounted on a splined portion 15 of a shaft 16 which projects through a housing 17. The housing 17 is provided with a cover 18, upwardly off-set sufficiently to accommodate the tree 19 of a yoke, the arms 20 and 21 of which embrace the peripheral rib 22 of the gear 14.

Rotatably mounted on the shaft 16 and positioned within the housing 17, is a bevel gear 23 having an internal gear 24 formed thereon and adapted for meshing with teeth 25 on one side of the gear 14. A similar bevel gear 26 is rotatably mounted on the shaft 16 and provided with the internal gear 27 adapted to mesh with the teeth 28 formed on the opposite end of the gear 14.

In the arrangement shown, I have illustrated a pair of shafts, 29 and 30 on each of which is fixedly mounted a bevel gear 31 and 32 respectively which are constantly in mesh with the bevel gears 23 and 26.

When the shaft 16 is rotated, the gear 14 rotates in unison therewith. When the gear 14 is shifted to the left so that the teeth 28 mesh with the teeth of the internal gear 27, the gear 26 will likewise rotate in unison with the shaft 16. Similarly when the gear 14 is shifted to the right so that the teeth 25 mesh with the teeth of the internal gear 24, the gear 23 will rotate in unison with the shaft 16.

The tree 19 of the yoke is provided with a head 33 having a passage 34 formed therein through which extends the slide rod 35 which is fixedly mounted in the cover 18 and which serves as a slide upon which the head 33 may slide. Projecting outwardly from the head 33 is a pair of spaced lugs 36 and 37 through which extend the pins 38 and 39.

The shifting lever 40 is provided with a head 41 at one end thereof and pivoted on the stud 42 which is journaled in the lateral projection 43 of the cover and which extends upwardly beyond the top of the cover. Secured to this outwardly projecting portion is one end of actuating lever 44 which may be attached to any desired mechanism for effecting the rocking of the stud 42. Upon a rocking of the stud 42, the lever 40 will rock on the center of the stud as a pivot. The free end of this lever, which is in the nature of a plate, is cut away at the corners as at 45 and 46, the cut away portion being arcuate and the space between these cut away portions being equal to the space between the pins 38 and 39.

In operation, the member 44 being fixedly attached to the stud 42 will be rocked when it is desired to operate the device, thus effecting a rocking of the stud 42. As the stud 42 rocks and the lever 40 swings on the axis of the stud 42 as a pivot, through the engagement of the lever 40 with the pins 38 and 39, the yoke tree 19 will be shifted so as to shift the gear 14 to one side or the other depending upon the direction in which the lever 40 is rocked. As shown in Fig. 7 when the lever 40 is rocked from the neutral position, shown in Fig. 5 and Fig. 6, to the left of the drawings, the yoke will be shifted to shift the gear 14 into mesh with the proper bevel gear 23 or 26. The lever 40 will be shifted so that the recess 45 rides out of engagement with the pin 39, thus bringing the straight end edge 47 into engagement with the periphery of the pin 39. This edge, on account of its incline, serves as a lock to prevent return movement of the gear 14 to neutral position. Thus, the lever 40 serves not only to effect a shifting of the gear, but serves also to secure the gear in its shifted position. The same operation takes effect when the gear is shifted in the opopsite direction as shown in Fig. 8.

It will be noted that the member 43 in which the stud 42 is journaled is a part separate from the cover or cap 18 so that it may be easily removed and replaced. By laterally shifting the center of the stud 42, longitudinally of the guide rod 35, the center pivot of the lever 40 will be shifted. This may be accomplished by removing the member 43 and replacing it with another part having the bearing located in a different lateral position. It is obvious that by shifting the pivot of the lever 40, the "throw" of the lever may be varied and thus it becomes possible to, by very simple modification or adjustment, accommodate the shifting mechanism to structures in which the travel of the shifted gear may vary.

What I claim as new is:

1. A gear shifting mechanism of the class described, comprising: a slide rod; a yoke mounted on said rod and slidable longitudinally thereof; a pair of spaced abutment members carried by said yoke; a rockably mounted shifting lever projectible at one of its ends between said abutment members, said shifting lever being of greater width than the distance between said abutment members and having the corners of its end cut away to provide concave arcuate surfaces and to provide a central portion narrower than the distance between and projectible between abutment members, and being of a length for, upon rocking in one direction, engaging at the surface of the cut away portion one of said abutment members for shifting said yoke in one direction, and, subsequent to the riding of said abutment members off of the surface of the cut away portion, for, at its end edge, engaging said abutment member and securing said yoke against return movement against said slide; and means operable at will for rocking said lever.

2. A gear shifting mechanism of the class described, comprising: a slide; a shifting yoke slidably mounted on said slide; a pair of abutment members carried by said yoke; a rockably mounted shifting lever having the corners of one end cut away to provide concave arcuate surfaces and to provide a centrally positioned outwardly projecting portion, said outwardly projecting portion being narrower than the distance between and projectible between said abutment members, said lever, upon shifting in either direction, engaging one or the other of said abutment members with the surface of said cut away portion for shifting said yoke on said slide, said lever being of such a length as to be adapted upon the riding of the surface of said cut away portion out of engagement with the abutment member, for engaging, with its end edge, the abutment member for securing said yoke against return shifting movement; and means for rocking said shifting lever.

3. A gear shifting mechanism of the class described, comprising: a slide; a shifting yoke slidably mounted on said slide; a pair of abutment members carried by said yoke; a rockably mounted shifting lever having the corners of one end cut away to provide concave arcuate surfaces and to provide a centrally positioned outwardly projecting portion, said outwardly projecting portion being narrower than the distance between and projectible between said abutment members, said lever, upon shifting, in either direction, engaging one or the other of said abutment members with the surface of said cut away portion for shifting said yoke on said slide, said lever being of such a length as to be adapted upon the riding of the surface of said cut away portion out of engagement with the abutment member, for engaging, with its end edge, the abutment member for securing said yoke against return shifting movement; means for rocking said shifting lever; and means for varying the throw of said shifting lever.

EDWARD GRACE.